(12) United States Patent
Shaw et al.

(10) Patent No.: US 8,507,090 B2
(45) Date of Patent: Aug. 13, 2013

(54) SPHERICAL MOLYBDENUM DISULFIDE POWDERS, MOLYBDENUM DISULFIDE COATINGS, AND METHODS FOR PRODUCING SAME

(75) Inventors: Matthew C. Shaw, Sahuarita, AZ (US); Carl V. Cox, Sahuarita, AZ (US); Yakov Epshteyn, Sahuarita, AZ (US)

(73) Assignee: Climax Engineered Materials, LLC, Phoeniz, AZ (US)

( * ) Notice: Subject to any disclaimer, the term of this patent is extended or adjusted under 35 U.S.C. 154(b) by 281 days.

(21) Appl. No.: 13/095,161

(22) Filed: Apr. 27, 2011

(65) Prior Publication Data

US 2012/0272869 A1  Nov. 1, 2012

(51) Int. Cl.
*B05D 1/08* (2006.01)
*B05D 1/10* (2006.01)
*B05D 1/12* (2006.01)

(52) U.S. Cl.
USPC ............ 428/402; 106/287.18; 423/561.1; 427/180; 427/446

(58) Field of Classification Search
None
See application file for complete search history.

(56) References Cited

U.S. PATENT DOCUMENTS

| | | | |
|---|---|---|---|
| 2,892,741 A | 6/1959 | Spengler et al. | |
| 3,062,741 A | 11/1962 | Crowl | |
| 3,073,779 A | 1/1963 | Wheeler | |
| 3,082,065 A | 3/1963 | Wheeler | |
| 3,156,420 A | 11/1964 | Crowl | |
| 3,479,289 A | 11/1969 | Van Wyk | |
| 3,661,508 A | 5/1972 | Ritsko | |
| 3,845,008 A | 10/1974 | Mitchell | |
| 4,039,697 A | 8/1977 | Isawa et al. | |
| 4,243,554 A | 1/1981 | Naummann et al. | |
| 4,284,244 A | 8/1981 | Hoover et al. | |
| 5,332,422 A | 7/1994 | Rao | |
| 5,358,753 A | 10/1994 | Rao et al. | |
| 5,476,632 A | 12/1995 | Shivanath et al. | |
| 5,484,662 A | 1/1996 | Rao | |
| 5,538,684 A | 7/1996 | Luk et al. | |
| 5,702,769 A | 12/1997 | Peters | |

(Continued)

FOREIGN PATENT DOCUMENTS

DE 102007029291 A1 12/2008
EP WO2010057667 A1 5/2010

(Continued)

OTHER PUBLICATIONS

International Search Report and Written Opinion for PCT/US2011/041340, dated Oct. 27, 2011, 8 pages.

(Continued)

*Primary Examiner* — Melvin C Mayes
*Assistant Examiner* — Colin W Slifka
(74) *Attorney, Agent, or Firm* — Fennemore Craig, P.C.

(57) ABSTRACT

Molybdenum disulfide powders include substantially spherically-shaped particles of molybdenum disulfide that are formed from agglomerations of generally flake-like sub-particles. The molybdenum disulfide powders are flowable and exhibit uniform densities. Methods for producing a molybdenum disulfide powder may include the steps of: Providing a supply of molybdenum disulfide precursor material; providing a supply of a liquid; providing a supply of a binder; combining the molybdenum disulfide precursor material with the liquid and the binder to form a slurry; feeding the slurry into a stream of hot gas; and recovering the molybdenum disulfide powder, the molybdenum disulfide powder including substantially spherically-shaped particles of molybdenum disulfide formed from agglomerations of generally flake-like sub-particles.

34 Claims, 8 Drawing Sheets

(56) References Cited

U.S. PATENT DOCUMENTS

| | | |
|---|---|---|
| 5,980,819 A | 11/1999 | Nakagawa et al. |
| 6,355,207 B1 | 3/2002 | Keyes |
| 6,376,103 B1 | 4/2002 | Sampath et al. |
| 6,395,202 B1 | 5/2002 | Nagel et al. |
| 6,623,876 B1 | 9/2003 | Caron |
| 6,689,424 B1 | 2/2004 | Wang et al. |
| 6,815,400 B2 | 11/2004 | Jee et al. |
| 7,045,489 B2 | 5/2006 | Cotter et al. |
| 7,470,307 B2 | 12/2008 | Larink, Jr. |
| 7,553,564 B2 | 6/2009 | Gupta et al. |
| 7,575,619 B2 | 8/2009 | Kawata et al. |
| 7,687,112 B2 | 3/2010 | Buehler et al. |
| 8,038,760 B1 | 10/2011 | Shaw et al. |
| 2004/0234407 A1 | 11/2004 | Szabo et al. |
| 2005/0202234 A1 | 9/2005 | Ogihara et al. |
| 2006/0079410 A1 | 4/2006 | Yadav |
| 2007/0032389 A1 | 2/2007 | Eadie et al. |
| 2007/0054057 A1 | 3/2007 | Matje et al. |
| 2007/0166478 A1 | 7/2007 | Itsukaichi et al. |
| 2008/0118538 A1 | 5/2008 | Hasegawa et al. |
| 2008/0247687 A1 | 10/2008 | Stecher |
| 2009/0098010 A1 | 4/2009 | Johnson et al. |
| 2009/0123690 A1 | 5/2009 | Scholl et al. |
| 2010/0119188 A1 | 5/2010 | Hsueh et al. |
| 2010/0255203 A1 | 10/2010 | Mosleh et al. |
| 2011/0236596 A1* | 9/2011 | Skorb et al. .................. 427/554 |
| 2012/0196129 A1* | 8/2012 | Okumura et al. ............. 428/402 |

FOREIGN PATENT DOCUMENTS

| | | |
|---|---|---|
| JP | 10226833 A | 8/1997 |
| JP | 2007231402 A | 9/2007 |
| JP | WO2011046122 A1 | 4/2011 |
| WO | 2003090319 A1 | 10/2003 |

OTHER PUBLICATIONS

International Search Report and Written Opinion for PCT/US2011/041344, dated Nov. 17, 2011, 9 pages.

International Search Report and Written Opinion for PCT/US2012/034942, dated Oct. 1, 2012, 11 pages.

* cited by examiner

SPHERICAL MOLYBDENUM DISULFIDE POWDERS, MOLYBDENUM DISULFIDE COATINGS, AND METHODS FOR PRODUCING SAME

TECHNICAL FIELD

This invention relates to molybdenum compounds in general and more particularly to molybdenum disulfide powders having unique characteristics, to methods for making such powders and to molybdenum disulfide coatings.

BACKGROUND

Molybdenum disulfide ($MoS_2$) is usually recovered from molybdenite ore obtained from "primary" mine sites, although it can be recovered from secondary or by-product molybdenite obtained from "non-primary" mine sites as well. For example, secondary molybdenite may be obtained from copper mines, wherein the secondary molybdenite is typically combined with copper-containing materials (e.g., copper sulfide). In such cases, molybdenum disulfide concentrate is obtained as a by-product from copper sulfide-molybdenum disulfide separation processes.

Broadly speaking, molybdenite ore consists of silicified granite compositions having deposits of soft, black, and hexagonal $MoS_2$ crystalline structures widely dispersed therein (e.g., in an average concentration of only about 0.03-0.6% by weight of the entire ore body). One of the largest sources of $MoS_2$-containing ore (e.g., molybdenite) is the Henderson molybdenum mine near Empire, Colo. (US), currently operated by the Climax Molybdenum Company, although other mine sites throughout the world are able to produce large amounts of this material as well. The Henderson mine site is characterized as a "primary" mine and is capable of producing large amounts of molybdenite ore.

In a typical processing operation, the molybdenite ore is initially subjected to a physical grinding process in which the ore is reduced in size to a plurality of small particles (e.g., having a typical particle size of about 100 U.S. mesh or less). The ore particles are then further treated to remove the desired $MoS_2$ therefrom. This treatment step may be accomplished using a variety of techniques, including froth flotation extraction procedures that employ various hydrocarbon compositions and wetting agents known in the art for this purpose. As a result, the desired $MoS_2$ may be effectively separated from ore-based waste materials (i.e., "gangue"), such as silica, silicates, clays, and other unwanted materials. The desired $MoS_2$ compositions will, by virtue of their minimal weight and density levels compared with the gangue, be readily isolated in the flotation froth.

The resulting molybdenum disulfide concentrate (i.e., from either primary or secondary sources, as noted above) may be dried and sized (e.g., by grinding and subsequent classification steps) to produce a molybdenum disulfide powder product having the desired grade and particle size. Exemplary grades of molybdenum disulfide include "technical," "technical fine," and "superfine" grades, although other grades are known and commercially available. Technical grades of molybdenum disulfide typically comprise about 98% (by weight) molybdenum disulfide, with the balance comprising various amounts of iron, molybdenum trioxide, water, oil, and carbon, depending on a wide variety of factors.

Molybdenum disulfide powders of the type just described may be used in any of a wide variety of products and for a wide variety of purposes. For example, molybdenum disulfide powders are commonly used as lubricants, e.g., either in "dry" form or when combined with a variety of oils and greases. Molybdenum disulfide may also be used to form molybdenum disulfide coatings on any of a wide range of articles, typically to enhance the lubricity of such materials. Molybdenum disulfide powders may also be combined with various materials, such as metals, metal alloys, resins, and polymers, to enhance the properties thereof.

SUMMARY OF THE INVENTION

Molybdenum disulfide powders according to the present invention comprise substantially spherically-shaped particles of molybdenum disulfide that are formed from agglomerations of generally flake-like sub-particles. The molybdenum disulfide powders are flowable and exhibit uniform densities.

A method for producing a molybdenum disulfide powder may include the steps of: Providing a supply of molybdenum disulfide precursor material; providing a supply of a liquid; providing a supply of a binder; combining the molybdenum disulfide precursor material with the liquid and the binder to form a slurry; feeding the slurry into a stream of hot gas; and recovering the molybdenum disulfide powder, the molybdenum disulfide powder including substantially spherically-shaped particles of molybdenum disulfide formed from agglomerations of generally flake-like sub-particles.

Also disclosed are coated articles having surface coatings thereon that are formed by depositing individual particles of a molybdenum disulfide spherical powder on the article so that individual particles of the molybdenum disulfide spherical powder bonds with the article, the molybdenum disulfide spherical powder comprising substantially spherically-shaped particles of molybdenum disulfide formed from agglomerations of generally flake-like sub-particles.

A method for producing a surface coating may involve the steps of: Providing a molybdenum disulfide spherical powder comprising substantially spherically-shaped particles of molybdenum disulfide formed from agglomerations of generally flake-like sub-particles; and depositing the molybdenum disulfide spherical powder on a substrate to form the surface coating.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
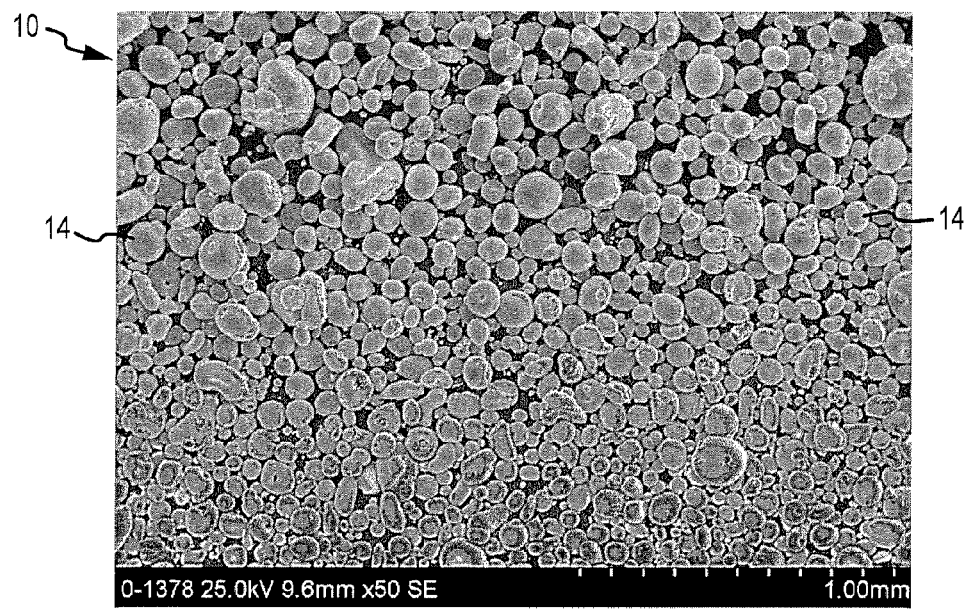
FIG. 1 is a scanning electron micrograph at 50× magnification of a molybdenum disulfide spherical powder produced from a Trial 9 embodiment.
Figure 2:
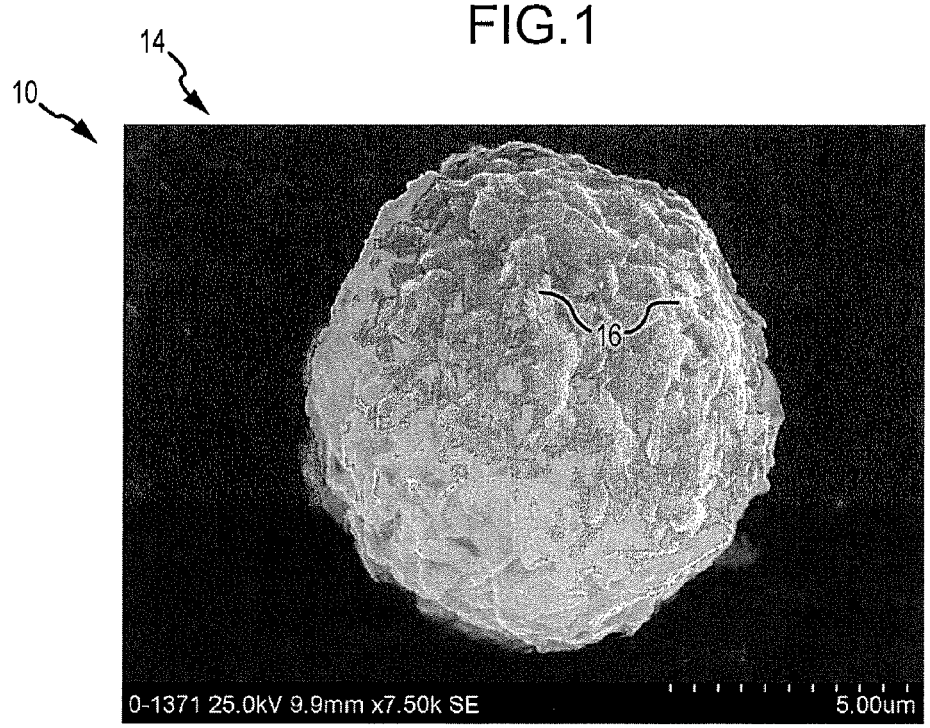
FIG. 2 is a scanning electron micrograph at 7500× magnification of a molybdenum disulfide spherical particle produced from a Trial 2 embodiment showing individual agglomerated sub-particles.
Figure 3:
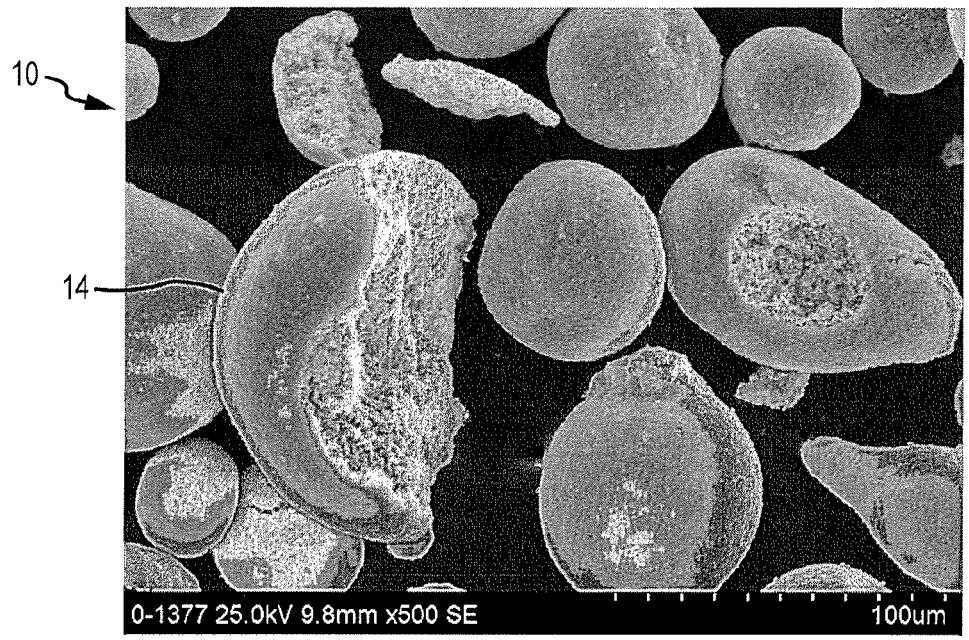
FIG. 3 is a scanning electron micrograph at 500× magnification of a broken substantially solid molybdenum disulfide spherical particle from a Trial 8 embodiment.
Figure 4:
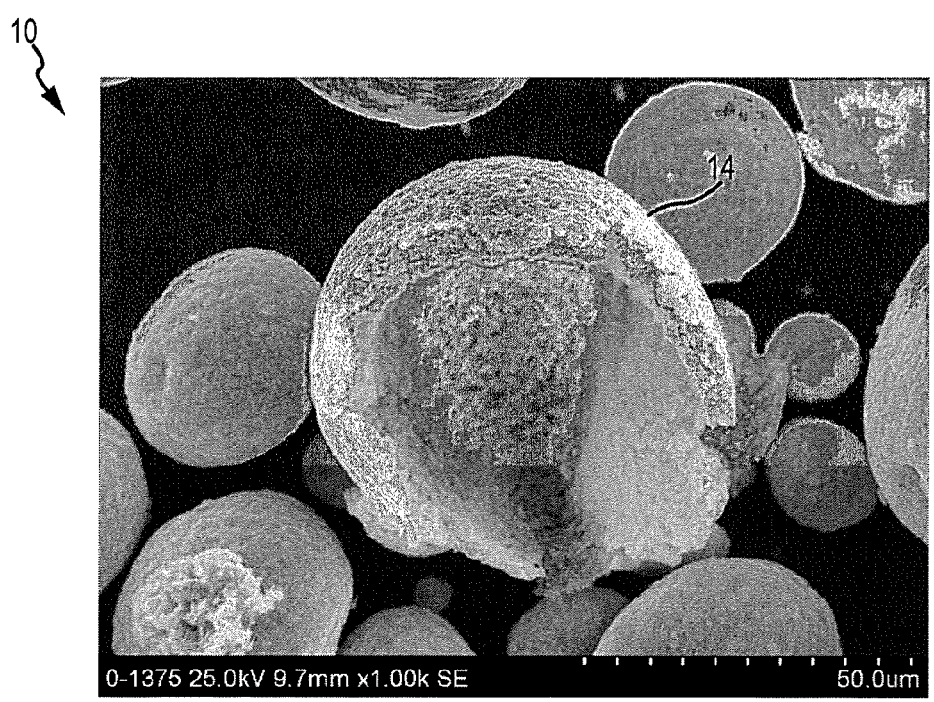
FIG. 4 is a scanning electron micrograph at 1000× magnification of a broken hollow molybdenum disulfide spherical particle from a Trial 6 embodiment.
Figure 5:
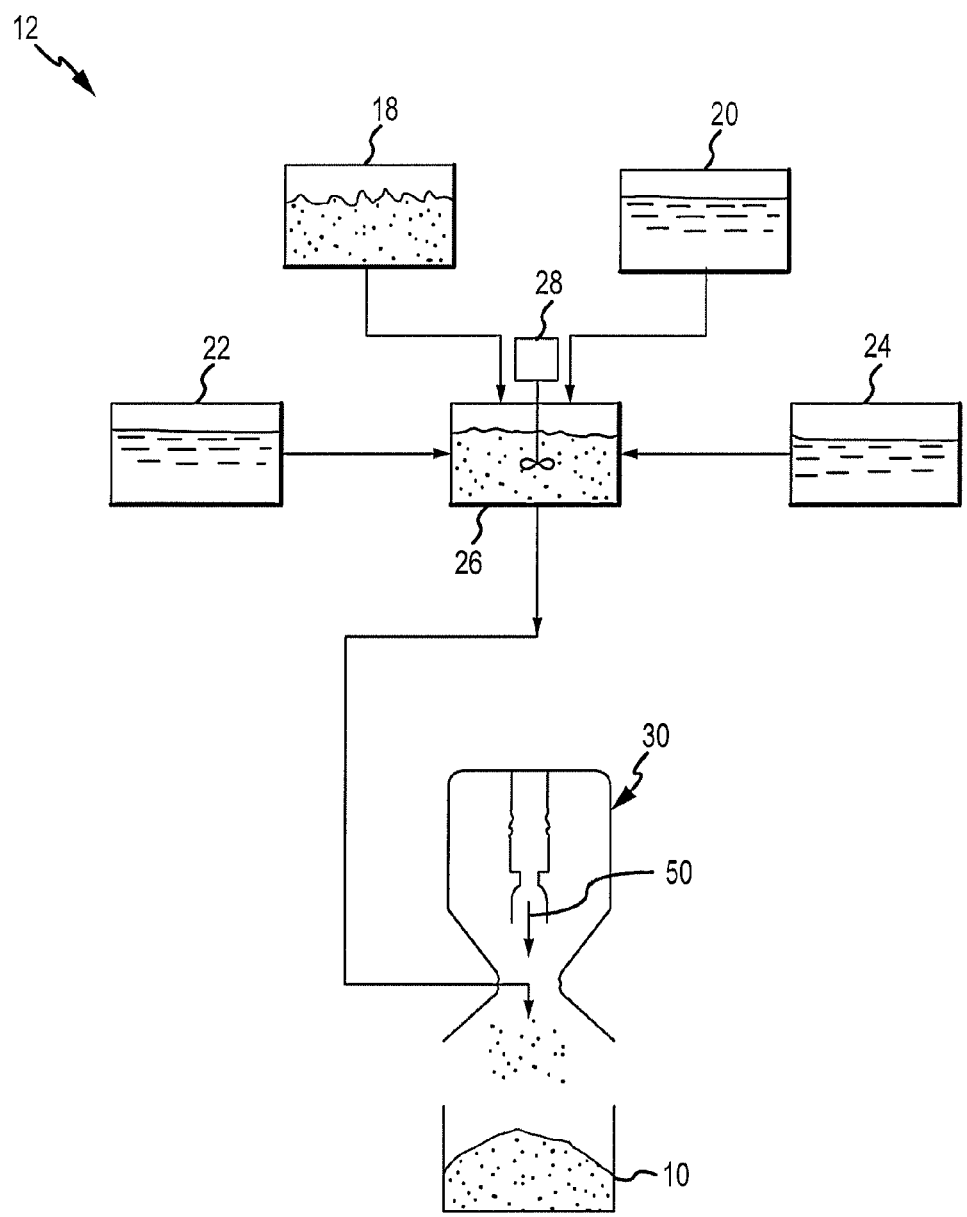
FIG. 5 is a process flow chart of basic process steps in one embodiment of a method for producing the molybdenum disulfide spherical powder product.

A molybdenum disulfide spherical powder product 10 according to various embodiments of the present invention is pictured in FIGS. 1-4 and may be produced by a process 12 illustrated in FIG. 5. Broadly speaking, the molybdenum disulfide spherical powder product 10 comprises a plurality of generally spherically-shaped particles 14 that are themselves agglomerations of smaller sub-particles 16, as best seen in FIG. 2. The sub-particles 16 comprise flake-like or plate-like particles that are adhered or agglomerated together, thereby forming the generally spherically-shaped particles 14. Accordingly, while the spherically-shaped agglomerated particles 14 have generally smooth, highly-spherical outer surfaces (e.g., as shown in FIG. 1), they nevertheless comprise lamellar-type structures (e.g., as shown in FIGS. 2 and 3). The molybdenum disulfide spherical powder product 10 according to the present invention thus may be characterized in the alternative as "spheres made of laminated flakes."

Many of the spherically-shaped agglomerated particles 14 comprising the spherical molybdenum disulfide powder 10 are substantially solid, i.e., non-hollow, as best seen in FIG. 3. However, others of the spherical particles 14 may be shell-like or hollow in structure, as best seen in FIG. 4. In addition, the generally spherically-shaped agglomerated particles 14 appear to have a thin film or coating thereon, as evidenced by the comparatively smooth, almost polished appearance of the particles 14 pictured in FIGS. 3, 4, 9, and 10. At the present time, it is believed that the thin film or coating on the particles 14 comprises residual amounts of binder 22 or dispersant 24 (or some combination thereof) that are brought to the surface of the particles 14 during the spray drying process. The thin surface film or coating may well provide the particles 14 with additional advantages and beneficial properties that are not associated with conventional molybdenum disulfide powders. For example, the thin film or coating may create a barrier that will prevent (or substantially reduce) various gases (e.g., oxygen) from reacting with the molybdenum disulfide comprising the particles 14. Such a barrier effect is particularly likely if the thin film or coating comprises the binder 22 or dispersant 24 materials (or some combination thereof).

As will be described in much greater detail herein, the molybdenum disulfide spherical powder products 10 produced in accordance with the teachings provided herein are generally quite flowable, unlike conventionally-produced molybdenum disulfide powders, which are not flowable. For example, exemplary spherical powder product embodiments 10 described herein exhibit Hall flowabilities from about 105 seconds for 50 grams of material (s/50 g) to as low as (i.e., more flowable) about 73 s/50 g.

In terms of density, the various embodiments of the molybdenum disulfide spherical powder product 10 exhibit densities comparable to conventionally-produced molybdenum disulfide powders of similar size. Moreover, the density of the powder products 10 produced in accordance with the teachings herein is highly uniform, with only small variations in powder densities being observed. For example, powder product embodiments described herein exhibited Scott densities in a range of about 0.9 g/cc to about 1 g/cc, tap densities in a range of about 1.1 g/cc to about 1.2 g/cc, and Hall densities in a range of about 0.9 g/cc to about 0.95 g/cc.

As mentioned earlier, the molybdenum disulfide spherical powder product 10 may be produced by the process or method 12 illustrated in FIG. 5. Briefly described, process 12 may comprise providing a supply of a molybdenum disulfide ($MoS_2$) precursor material 18. The molybdenum disulfide precursor material 18 is combined with a liquid 20, such as water, as well as a binder 22, and a dispersant 24, to form a pulp or slurry 26. In one embodiment, the liquid 20, binder 22, and dispersant 24 are combined together before adding the molybdenum disulfide precursor material 18 to form the slurry 26, although the various ingredients may be combined in other sequences. The resulting slurry 26, i.e., comprising the molybdenum disulfide precursor material 18, liquid 20, binder 22, and dispersant 24, may then be mixed as necessary (e.g., by a mixer 28) so that the slurry 26 is well-mixed, i.e., substantially homogeneous. Thereafter, the slurry 26 may be fed into a spray dryer 30 in order to produce the molybdenum disulfide spherical powder product 10 (e.g., illustrated in FIGS. 1-4).

Figure 6:
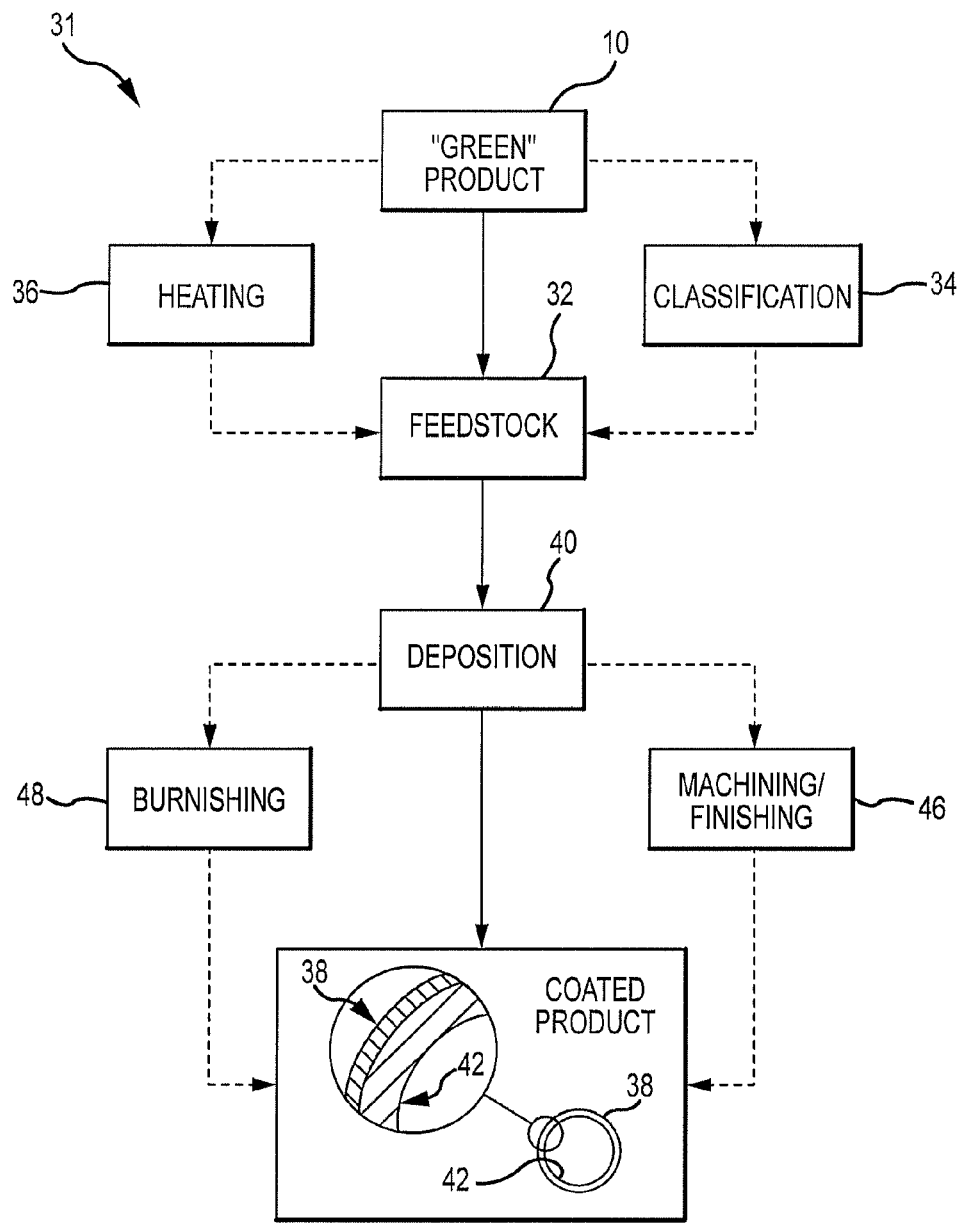
FIG. 6 is a process flow chart of basic process steps in one embodiment of a method for producing surface coatings from the molybdenum disulfide spherical powder product.

Referring now to FIG. 6, the molybdenum disulfide spherical powder product 10 from the spray dryer 30 may be used in a process 31 to form a coated product 38. Alternatively, the molybdenum disulfide spherical powder product 10 may be used in a wide variety of other processes and applications, some of which are described herein. Depending on the particular process and/or application, the molybdenum disulfide powder product 10 may be used in its as-produced or "green" form as a feedstock 32 for the process 31. Alternatively, the "green" spherical powder product 10 may be further processed, e.g., by screening or classification 34, by heating 36, or by combinations thereof, before being used as powder feedstock 32.

The molybdenum disulfide spherical powder feedstock 32 (e.g., in either the "green" form or in the processed form) may be deposited on at least a portion of a substrate or article 38 at step 40 in order to form or create a surface coating 42 on the article 38. By way of example, in one embodiment, the coated article 38 (i.e., having the $MoS_2$ surface coating 42 provided thereon) may comprise a plain bearing 44. Alternatively, such molybdenum disulfide surface coatings 42 may be applied to any of a wide range of other types of substrates and/or articles.

The particular deposition process 40 used to form the molybdenum disulfide surface coating 42 on article 38 may comprise any of a wide range spray-type deposition processes capable of imparting sufficient energy to the feedstock material 32 so that the powder product 10 bonds to the article 38 to form the surface coating 42. Spray deposition processes suitable for forming such surface coatings 42 include various types of thermal spray, plasma spray, and high-velocity oxygen fuel spray (HVOF) deposition processes. Cold spray deposition processes may also be used.

After being provided with the surface coating 42, the article 38 (e.g., plain bearing 44) may be used "as is" i.e., directly from the deposition process 40. Alternatively, the coated article 38 may be further processed, e.g., by machining/surface finishing 46, by burnishing 48, or by other processes, in which case the coated article 38 will comprise a processed coated article.

The molybdenum disulfide spherical powder product 10 according to the present invention exhibits several unique structural characteristics, morphologies, and properties that are not found in conventional molybdenum disulfide powders produced by conventional processes. For example, on a morphological basis, the spherically-shaped particles 14 comprising the molybdenum disulfide powder product are unknown in the art. In contrast, conventional molybdenum disulfide powders produced by conventional processes are characterized by individual particles that are flake-like or plate-like in nature.

Significantly, the spherical nature of the particles 14 of the powder product 10 of the present invention provides the powders with high flowabilities, not only on an absolute scale (i.e., as measured by Hall flow), but also in comparison with conventional molybdenum disulfide powders, which are not flowable at all. The high flowability of the molybdenum disulfide powders of the present invention makes them well-suited for use in various powder processes where flowability is important. Consequently, the flowable molybdenum disulfide powders of the present invention may be used to advantage in any of a wide range of processes that are currently unavailable for use with conventional molybdenum disulfide powders due to their lack of flowability.

Still further, the molybdenum disulfide spherical powders 10 of the present invention have densities that are comparable to densities associated with conventional molybdenum disulfide powders of comparable size. Moreover, the densities of the spherical powder product of the present invention are also highly-uniform, with only small variations in density being observed among various powder lots.

The favorable flowabilities and densities associated with the molybdenum disulfide spherical powders of the present invention allow the spherical powder product to be used to advantage in a wide range of applications, many of which are currently known, but others of which have yet to be developed, that can take advantage of the favorable density and flowability characteristics of the spherical powder product. For example, the high flowability of the molybdenum disulfide spherical powder product 10 allows it to be used to advantage in a wide variety of spray-type deposition processes to form surface coatings of molybdenum disulfide.

Having briefly described various embodiments and aspects of the present invention, as well as certain features and advantages thereof, various embodiments of the molybdenum disulfide spherical powder products 10, methods 12 for producing them, as well as various exemplary applications for the powders 10 will now be described in detail.

Referring now primarily to FIG. 5, the molybdenum disulfide spherical powder product 10 may be prepared in accordance with a method or process 12. Process 12 may comprise providing a supply of molybdenum disulfide precursor material 18. The molybdenum disulfide precursor material 18 may comprise a molybdenum disulfide powder material having any of a wide range of particle sizes. Generally speaking, the molybdenum disulfide powders having particle sizes in a range of about 1 μm to about 30 μm work well and may be used in process 12. Suitable grades of molybdenum disulfide include "technical," "technical fine," and "superfine" grades.

Molybdenum disulfide powders suitable for use in the present invention (i.e., as the molybdenum disulfide precursor material 18) are commercially available from Climax Molybdenum Company, a Freeport-McMoRan Company, Ft. Madison Operations, Ft. Madison, Iowa (US). Alternatively, molybdenum disulfide powders available from other sources may be used as well. By way of example, in some embodiments, the molybdenum disulfide precursor material 18 comprises a technical fine grade of molybdenum disulfide powder commercially available from Climax Molybdenum Company. In other embodiments, the molybdenum disulfide precursor material 18 comprises a superfine grade of molybdenum disulfide powder, also available from Climax Molybdenum Company.

As briefly described above, the molybdenum disulfide precursor material 18 may be mixed with a liquid 20, a binder 22, and a dispersant 24 to form a pulp or slurry 26. In one embodiment, the liquid 20, binder 22, and dispersant 24 are combined together before the molybdenum disulfide precursor material 18 is added. Alternatively, the various ingredients comprising the slurry 26 may be combined in other sequences depending on a variety of factors, as would become apparent to persons having ordinary skill in the art after having become familiar with the teachings provided herein. Consequently, the present invention should not be regarded as limited to any particular sequence for combining the various ingredients of the slurry 26.

Liquid 20 serves as a carrier medium for the molybdenum disulfide precursor material 18, allowing it be atomized into fine droplets in the spray dryer 30. Generally speaking, liquid 20 may comprise water, although other liquids, such as alcohols, volatile liquids, organic liquids, and various mixtures thereof, may also be used, as would become apparent to persons having ordinary skill in the art after having become familiar with the teachings provided herein. Consequently, the present invention should not be regarded as limited to the particular liquids 20 described herein. However, by way of example, in the particular embodiments shown and described herein, the liquid 20 comprises deionized water.

Binder 22 assists in the agglomeration of the molybdenum disulfide sub-particles 16 to form the generally spherically-shaped particles 14 comprising the molybdenum disulfide spherical powder product 10. Binder 22 may therefore comprise any of a wide range of materials that are now known in the art or that may be developed in the future that would be suitable for this purpose. By way of example, in the particular embodiments shown and described herein, binder 22 comprises polyvinyl alcohol (PVA).

Dispersant 24 assists in producing a substantially foam-free or foamless slurry 26, in which the molybdenum disulfide precursor material 18 is substantially evenly dispersed within the liquid 20, as opposed to being suspended in a foam layer on the surface of slurry 26. The ability to form a foamless slurry 26, i.e., in which the molybdenum disulfide precursor material 18 is substantially evenly dispersed therein, but without significant foaming, is believed to substantially increase the number and sphericity of the agglomerated particles 14 comprising the powder product 10. For example, and as will be described in greater detail below in the Examples, slurry composition number 1 (i.e., Slurry 1), which lacked a dispersant 24, contained a significant amount of foam. The molybdenum disulfide powder product made from Slurry 1 (i.e., from Trial 1) and shown in FIG. 12, contained substantially fewer agglomerated particles 14 compared to the powder products 10 made from dispersant-containing slurries 26 (i.e., Slurries 2-4) shown in FIGS. 1 and 8. Moreover, those agglomerated particles 14 that were formed from Slurry 1 were generally less spherical than those produced from slurries containing dispersant 24, again, as best seen by comparing the powders of FIGS. 1 and 8 (made from slurries 26 containing a dispersant 24) with the powder of FIG. 12 (made from a slurry 26 lacking a dispersant 24). Surprisingly and unexpectedly, the addition of a dispersant 24 is critical in achieving many of the objects and advantages of the present invention.

In accordance with the foregoing considerations, then, dispersant 24 may comprise any of a wide range of dispersants now known in the art or that may be developed in the future that are, or would be, suitable for dispersing the molybdenum disulfide precursor material 18 throughout the slurry 26, thereby enhancing the production of generally spherically-shaped agglomerated particles 16 during the spray drying process. Example dispersants 24 suitable for use in the present invention include, but are not limited to various types of detergents, such as alcohol ethoxylates and alcohol alkoxylates. By way of example, in the particular embodiments shown and described herein, dispersant 24 comprises p-tert-octylphenol ethoxylate (a nonionic alcohol ethoxylate detergent, CAS#9002-93-1), which is currently commercially available from the Dow Chemical Company and other vendors under the registered trademark "Triton X-100."

Also in accordance with the foregoing considerations, it may be possible in other embodiments to substitute a defoaming agent for the dispersant 24. The use of a defoaming agent will assist in the removal of any foam created during the slurry formation process, thus aiding in the re-dispersion of the molybdenum disulfide precursor material 18 in slurry 26. Defoaming agents suitable for use with the present invention may include any of a wide range of water-based and ethylene oxide/propylene oxide (EO/PO)-based agents.

As described above, it is generally preferable to combine the liquid 20, binder 22, and dispersant 24 before adding the molybdenum disulfide precursor material 18. Combining the ingredients in this order generally allows the binder 22 and the dispersant 24 to be completely dissolved and/or dispersed within liquid 20 before the molybdenum disulfide precursor material 18 is added, thereby enhancing the homogeneity of the resulting slurry 26. In addition, this combination sequence would be well-suited for situations wherein the particular binder 22 and/or dispersant 24 to be used are provided in powder, as opposed to liquid, form. Alternatively, of course, other combination sequences are possible depending on the particular materials to be used, the particular mixing apparatus involved, and other factors, as would become apparent to persons having ordinary skill in the art after having become familiar with the teachings provided herein. Consequently, the present invention should not be regarded as limited to any particular combination sequence for the constituents of slurry 26.

The molybdenum disulfide precursor material 18 should be added to the liquid mixture (e.g., comprising liquid 20, binder 22, and dispersant 24) in an amount sufficient to result in a slurry 26 having a "solids loading" (i.e., the weight percent of solids in the slurry 26) in a range of about 50% by weight to about 60% by weight solids (e.g., primarily as molybdenum disulfide, although the binder 22 and dispersant 24 may involve some solid constituents as well). Preferable solids loadings may be in a range of about 52-58% by weight solids, while more preferable solids loadings may be in a range of about 52-56% by weight solids. Generally speaking, slurries 26 comprising solids loadings greater than about 60% by weight may create difficulties in pumping the slurry 26 into the spray dryer 30. Slurries 26 having solids loadings in excess of about 60% by weight may also result in frequent clogging of the nozzle 70 (FIG. 4) of spray dryer 30 and may create other problems. On the other hand, solids loadings less than about 50% by weight will generally result in production inefficiencies, e.g., increased time and/or energy requirements to produce a given quantity of the molybdenum disulfide powder product 10.

After being prepared, slurry 26 may be spray dried (e.g., in spray dryer 30) to produce the molybdenum disulfide spherical powder product 10. By way of example, in one embodiment, spray dryer 30 may comprise a pulse combustion spray dryer of the type shown and described in U.S. Pat. No. 7,470,307, of Larink, Jr., entitled "Metal Powders and Methods for Producing the Same," which is specifically incorporated herein by reference for all that it discloses.

Briefly described, the spray dry process involves feeding slurry 26 into the pulse combustion spray dryer 30. In the spray dryer 30, slurry 26 impinges a stream of hot gas (or gases) 50, which is pulsed at or near sonic speeds. The sonic pulses of hot gas 50 contact the slurry 26 and drive-off substantially all of the liquid component (e.g., liquid 20, binder 22, and dispersant 24), resulting in the formation of the spherical powder product 10.

Figure 7:
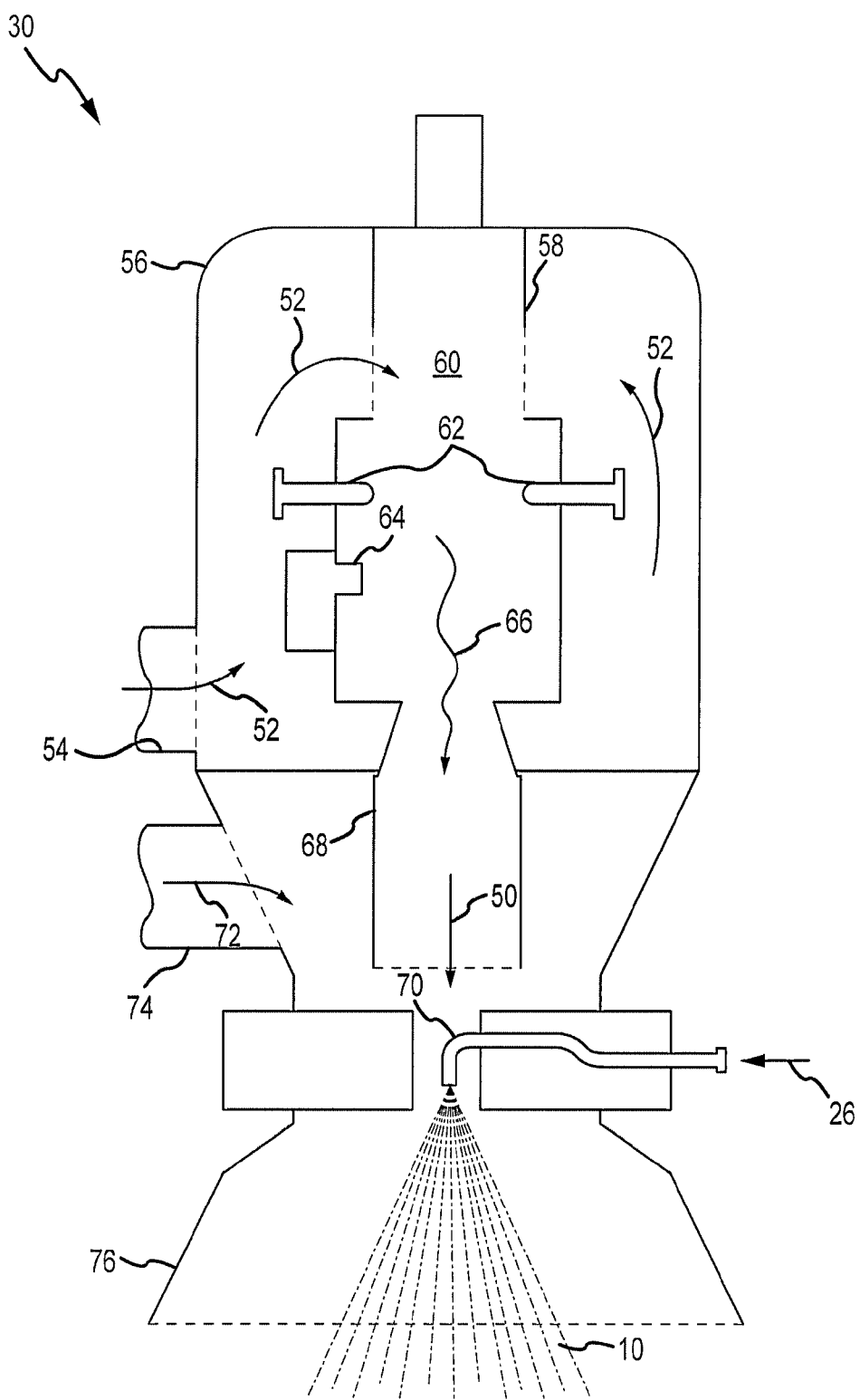
FIG. 7 is a schematic representation of one embodiment of pulse combustion spray dry apparatus that may be used to produce the molybdenum disulfide spherical powder product.

More specifically, and with reference now primarily to FIG. 7, combustion air 52 may be fed (e.g., pumped) through an inlet 54 of spray dryer 30 into the outer shell 56 at low pressure, whereupon it flows through a unidirectional air valve 58. The combustion air 52 then enters a tuned combustion chamber 60 where fuel is added via fuel valves or ports 62. The fuel-air mixture is then ignited by a pilot 64 to create a pulsating stream of hot combustion gases 66. The hot combustion gases 66 may be pressurized to a variety of pressures, e.g., in a range of about 0.003 MPa (about 0.5 psi) to about 0.2 MPa (about 3 psi) above the combustion fan pressure. The pulsating stream of hot combustion gases 66 rushes down tailpipe 68 toward the atomizer or nozzle 70. Just above the nozzle 70, quench air 72 may be fed through an inlet 74 and may be blended with the hot combustion gases 66 in order to attain the pulsating stream of hot gases 50 having the desired temperature. By way of example, the temperature of the pulsating stream of hot gas 50 may be in a range of about 300° C. to about 800° C. (570° F. to about 1470° F.), such as about 490° C. to about 600° C. (910° F. to about 1110° F.), and more preferably about 545° C. (1013° F.)

The slurry 26 is introduced into the pulsating stream of hot gases 50 via the atomizer or nozzle 70. The atomized slurry may then disperse and begin to dry in the conical outlet 76 and thereafter enter a tall-form drying chamber (not shown). Further downstream, the spherical powder product 10 may be recovered using standard powder collection equipment, such as cyclones and/or baghouses (also not shown).

In pulsed operation, the air valve 58 is cycled open and closed to alternately let air into the combustion chamber 60 for the combustion thereof. In such cycling, the air valve 58 may be reopened for a subsequent pulse just after the previous combustion episode. The reopening of air valve 58 allows a subsequent air charge (e.g., combustion air 52) to enter. The fuel valve 62 re-admits fuel, and the mixture auto-ignites in the combustion chamber 60, as described above. This cycle of opening and closing the air valve 58 and burning (i.e., combusting) the fuel in the chamber 60 in a pulsing fashion may be controllable at various frequencies, e.g., from about 80 Hz to about 110 Hz, although other frequencies may also be used.

The "green" or as-produced molybdenum disulfide spherical powder product 10 produced by the pulse combustion spray dryer 30 described herein is shown in FIGS. 1-4 and 8-12 and comprises a plurality of generally spherically-shaped particles 14 that are themselves agglomerations of smaller sub-particles 16. See, for example, FIGS. 1, 9, and 10. The smaller sub-particles 16 comprise flake-like or plate-like particles that are adhered together, so that the overall spherical particles 14 comprise a lamellar type structure (i.e., a composite powder comprising "spheres made of laminated flakes"). See, for example, FIGS. 2 and 11. Many of the agglomerated spherical particles 14 comprising the molybdenum disulfide powder product 10 are substantially solid, i.e., non-hollow, as best seen in FIG. 3, while others are shell-like or hollow in structure, as best seen in FIG. 4.

As was briefly described above, the generally spherically-shaped agglomerated particles 14 appear to have a thin film or coating thereon, as evidenced by the comparatively smooth, almost polished appearance of the particles 14. See, for example, the particles 14 pictured in FIGS. 3, 4, 9, and 10. It is believed that the thin film or coating on the particles 14 comprises residual amounts of binder 22, dispersant 24, or some combination thereof, that are brought to the surface of the particles 14 during the spray drying process.

The thin surface film or coating may well provide the particles 14 with additional advantages and beneficial properties that are not associated with conventional molybdenum disulfide powders. For example, if the particular composition of the thin film or coating (e.g., the material used as binder 22 and/or dispersant 24) is impervious to certain materials, then it is expected that the thin film or coating on the particles 14 would be impervious to those materials as well. In the particular example powder products 10 described herein (i.e., made with PVA as the binder material 22), it is expected that the thin films on the particles 14 will be impervious to the same materials (such as oxygen) as PVA. Therefore, particles 14 produced in accordance with the teachings provided herein will likely exhibit reduced levels of oxidization compared with conventional molybdenum disulfide particles produced by conventional processes. The thin film or surface coatings on the particles may therefor be customized or engineered to provide the particles 14 with certain attributes or properties by providing the appropriate materials during the mixing or slurring process.

Generally speaking, the molybdenum disulfide spherical powder product 10 produced in accordance with the teachings provided herein will comprise a wide range of sizes, and particles having sizes ranging from about 1 μm to about 500 μm, such as, for example, sizes ranging from about 1 μm to about 100 μm, can be readily produced by the following the teachings provided herein. Sieve analyses of various "as-produced," i.e., green molybdenum disulfide spherical powder products 10 are provided in Tables V and VI. The molybdenum disulfide spherical powder product 10 may be classified e.g., at step 34 (FIG. 6), if desired, to provide a product 10 in a desired size range.

A significant difference between the molybdenum disulfide spherical powder product 10 of the present invention and conventional molybdenum disulfide powders relates to the flowability of the powder product 10. More particularly, the molybdenum disulfide spherical powder product 10 according to the present invention is generally quite flowable, whereas conventional molybdenum disulfide powders are not. Exemplary powder products 10 display Hall flowabilities in the range of about 105 s/50 g (slower flow) to about 80 s/50 g (faster flow). In some exemplary embodiments, Hall flowabilities may be as low (i.e., more flowable) as 73.8 s/50 g. In some cases, the flowability of the as-produced molybdenum disulfide spherical powder product 10 may be enhanced (i.e., increased) by screening or classification, particularly if the as-produced product contains larger agglomerations.

The density of the molybdenum disulfide spherical powder product 10 is comparable to other molybdenum disulfide powders of similar size and produced by conventional processes. Moreover, the density of the powder products 10 produced in accordance with the teachings herein is fairly consistent, with only small variations in powder densities being observed among the various powder lots. Exemplary molybdenum disulfide powder products 16 have Scott densities in a range of about 0.9 g/cc to about 1 g/cc, tap densities in a range of about 1.1 to about 1.2 g/cc, and Hall densities in a range of about 0.9 g/cc to about 0.95 g/cc, as set forth in Table IV.

As mentioned above, the pulse combustion spray dryer 30 provides a pulsating stream of hot gases 50 into which is fed the slurry 26. The contact zone and contact time are very short, the time of contact often being on the order of a fraction of a microsecond. Thus, the physical interactions of hot gases 50, sonic waves, and slurry 26 produces the molybdenum disulfide spherical powder product 10. More specifically, the liquid 20 component of slurry 26 is substantially removed or driven away by the sonic (or near sonic) pulse waves of hot gas 50. The short contact time also ensures that the slurry components are minimally heated, e.g., to levels on the order of about 115° C. at the end of the contact time, temperatures which are sufficient to evaporate the liquid component of slurry 26.

However, in certain instances, residual amounts of liquid (e.g., liquid 20, binder 22 and/or dispersant 24) may remain in the resulting green molybdenum disulfide spherical powder product 10. Any remaining liquid may be driven-off (e.g., partially or entirely), by a subsequent heating process or step 36 (FIG. 6). Generally speaking, the heating process 36 should be conducted at moderate temperatures. Heating 36 may be conducted at temperatures within a range of about 90° C. to about 120° C. (about 110° C. preferred). Alternatively, temperatures as high as 800° C. may be used for short periods of time. In many cases, it may be preferable to conduct the heating 36 in a hydrogen atmosphere in order to minimize oxidation of the molybdenum disulfide spherical powder product 10.

It may also be noted that the agglomerations of the molybdenum disulfide spherical powder product 10 retain their shapes (i.e., substantially spherical), even after the heating step 36. In fact, heating 36 may, in certain embodiments, result in an increase in flowability of the molybdenum disulfide spherical powder product 10.

In some instances a variety of sizes of agglomerated particles 14 comprising the molybdenum disulfide spherical powder product 10 may be produced during the spray drying process. It may be desirable to further separate or classify the as-produced molybdenum disulfide spherical powder product 10 into a powder product having a size range within a desired product size range. For example, most of the molybdenum disulfide spherical powder product 10 produced will comprise particle sizes in a wide range (e.g., from about 1 μm to about 500 μm), with substantial amounts (e.g., in a range of 40-50 wt. %) of product being smaller than about 53 μm (i.e., –270 U.S. mesh).

The process 12 described herein may yield a substantial percentage of molybdenum disulfide spherical powder product 10 in this size range. However, there may be remainder products, particularly the smaller products, outside the desired product size range which may be recycled through the system, though liquid (e.g., water) would again have to be added to create an appropriate slurry composition. Such recycling is an optional alternative (or additional) step or steps.

In any event, once the molybdenum disulfide spherical powder product 10 has been prepared (i.e., in accordance with process 12), it may be used as a feedstock material 32 in the process 31 illustrated in FIG. 6 to produce a surface coating 42 on article 38.

The article or substrate 38 to be coated may comprise a wide variety of materials (e.g., metals and metal alloys) desired to be coated with the molybdenum disulfide surface coatings 42. Exemplary materials for the article or substrate 38 include aluminum, aluminum alloys, iron, iron alloys (e.g., steel and stainless steel alloys), molybdenum, molybdenum alloys, bronze, and brass, just to name a few. Alternatively, substrates or articles 38 comprising other materials, either now known in the art or that may be developed in the future, may also be used, as would become apparent to persons having ordinary skill in the art after having become familiar with the teachings provided herein. Consequently, the present invention should not be regarded as limited to surface coatings 42 applied to articles or substrates 38 comprising any particular material.

Generally speaking, molybdenum disulfide spherical powder products 10 suitable for use herein (e.g., as feedstock material 32) may comprise any of a wide range of particle sizes and mixtures of particle sizes, so long as the particle sizes allow the spherical powder product 10 to be deposited (e.g., by the various processes 40 described herein) to form coatings 42.

As mentioned above, it may be desirable or advantageous to classify the green molybdenum disulfide spherical powder product 10 before being used as a feedstock 32 for the deposition process 40. Factors to be considered include, but are not limited to, the type of article 38 that is to be coated, the desired or required material characteristics (e.g., thickness and/or density) of the surface coating 42, as well as the particular deposition process 40 and/or deposition equipment that is to be used.

The desirability and/or necessity to first classify the molybdenum disulfide spherical powder product 10 will also depend on the particular particle sizes of the green or "as-produced" spherical powder product 10 made by the process 12 of FIG. 5. That is, depending on the particular process parameters that are used to produce the green spherical powder product 10 (exemplary embodiments of which are described herein), it may be possible or even advantageous to use the spherical powder product 10 in its green or as-produced form. Alternatively, of course, other considerations may indicate the desirability of first classifying the green spherical powder product 10.

In summation, then, because the desirability and/or necessity of classifying the green or as-produced molybdenum disulfide powder product 10 will depend on a wide variety of factors and considerations, some of which are described herein and others of which will become apparent to persons having ordinary skill in the art after having become familiar with the teachings provided herein, the present invention should not be regarded as requiring a classification step 34 or to a green molybdenum disulfide powder product 10 having any particular particle size distribution.

The molybdenum disulfide spherical powder product 10 may also be heated, e.g., at step 36, if required or desired, before being used as a feedstock 32. Such heating 36 of the molybdenum disulfide spherical powder product 10 may be used to remove any residual moisture and/or volatile material that may remain in the green spherical powder product 10 after spray drying. In some instances, heating 36 of the molybdenum disulfide spherical powder product 10 may also have the beneficial effect of increasing the flowability of the spherical powder product 10.

The feedstock material 32 (i.e., comprising either the green molybdenum disulfide spherical powder product 10 or a heated/classified powder product) may then be deposited at step 40 to produce the desired surface coating 42 on the article 38. The deposition process 40 should supply sufficient energy to the molybdenum disulfide spherical powder product 10 to cause it to bond to the substrate or article 38 and form an adherent surface coating 42. Typically, the individual particles 14 of the molybdenum disulfide spherical powder product 10 will be in at least a plastic state, if not a molten or partially molten state (i.e., at or above the liquidus temperature), during the deposition process. Stated another way, the particular deposition process 40 used should provide sufficient energy to cause the individual particles 14 of the molybdenum disulfide spherical powder product 10 to bond with the substrate 38 to form the surface coating 42. Deposition processes 40 that may be used with the present invention include, but are not limited to, thermal spray, plasma spray, high velocity oxygen fuel spray (HVOF), and cold spray deposition processes.

As used herein, the term "thermal spraying" or "thermal spray" deposition refers to spray coating processes in which heated coating materials are sprayed onto a surface to form the coating. The coating material (e.g., powder feedstock 32) may be heated by an electrical arc discharge or by the combustion of a suitable fuel to a temperature that is at or above the liquidus temperature of the feedstock material. So heating the feedstock material causes it to be in at least a plastic state when it impinges the article 38 being coated. The particle velocities in thermal spray deposition processes are comparatively low, generally below about 150 m/s (i.e., less than about 490 ft/s).

The terms "plasma spraying" and "plasma spray" deposition as used herein refer to spray coating processes wherein a high-temperature plasma jet generated by an electrical arc discharge supplies the energy for accelerating and heating the feedstock material 32. Plasma spray processes are distinguished from thermal spray processes in that the temperature of the plasma jet is considerably greater than the temperatures involved with thermal spray processes. In most cases, the temperature of the plasma jet is in excess of 10,000° C. (about 18,000° F.). Thus, as used herein, plasma deposition or plasma spray processes refers to processes in which the temperature of the heating jet is in excess of about 10,000° C.

High velocity oxygen fuel (HVOF) spray deposition processes involve the production of a high temperature, high speed (e.g., generally supersonic) spray jet. In a typical HVOF system, a mixture of a gaseous or liquid fuel and oxygen is fed into a combustion chamber wherein they are continuously burned. The hot combustion gases are directed though a converging-diverging nozzle that accelerates the combustion gases to supersonic speeds. The coating material or powder feedstock is injected into the supersonic gas stream, which is directed to the surface to be coated.

In addition to the thermal, plasma, and HVOF spray deposition processes described herein, cold spray deposition processes may also be used to form the surface coating 42. As its name implies, cold spray deposition refers to those processes that utilize the kinetic energy, rather than heat, to provide the energy required to cause the sprayed particles to bond to the substrate (i.e., while in a plastic state). Cold spraying processes are commonly regarded as those processes in which the material is sprayed in the absence of a flame and at temperatures below about 600° C. If a cold spraying process is to be used, it should impart sufficient kinetic energy to the molybdenum disulfide spherical powder product 10 to cause the powder 10 to bond to the article or substrate 38 to be coated.

Before proceeding with the description, it should be noted that apparatus for performing the various spray deposition processes described herein (e.g., thermal, plasma, HVOF, and cold spray deposition processes) are well-known in the art and readily commercially available. In addition, techniques and methods for using such apparatus to perform the various types of spray deposition processes are also well-known in the art and could be readily implemented by persons having ordinary skill in the art after having become familiar with the teachings provided herein. Consequently, the particular apparatus and methods used to perform such thermal, plasma, HVOF, and cold spray deposition processes will not be described in further detail herein.

After deposition 40, the resulting coated article 38 (e.g., plain bearing 44) may be used "as is" or may be further processed if required or desired. For example, the coated article 38 may be subjected to one or more surface finishing steps 46, if necessary or desired, before being placed in service. Exemplary surface finishing steps include, but are not limited to, machining, bead blasting, and polishing. The coated article 38 may also be burnished at step 48 in order to further prepare the surface coating 42 for service.

EXAMPLES

Four different slurry compositions or mixtures, referred to herein as Slurries 1-4, were prepared in accordance with the teachings provided herein. The four slurries were then spray dried in nine (9) separate spray dry trials (designated herein as Trials 1-9), to produce nine (9) different powder preparations or embodiments. The first slurry composition, i.e., Slurry 1, was used in the first spray dry trial (i.e., Trial 1), with the second, third and fourth slurry compositions (i.e., Slurries 2-4) being used in Trials 2-4, 5-7, and 8-9, respectively, as indicated in Tables II and III.

Figure 12:
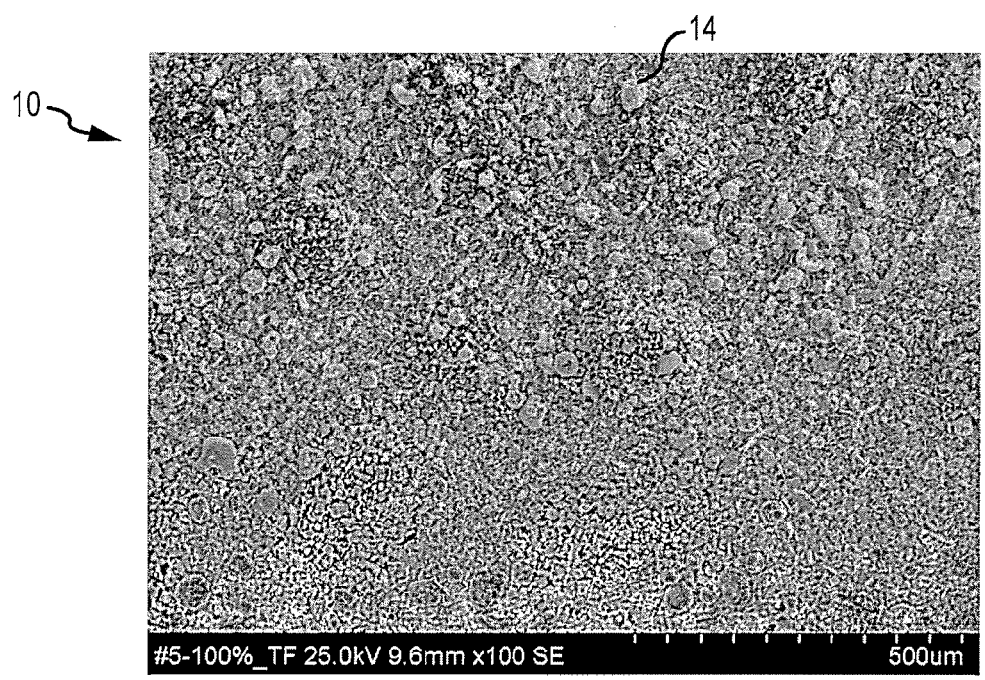
FIG. 12 is a scanning electron micrograph at 100× magnification of a molybdenum disulfide spherical powder product produced from a Trial 1 embodiment.

As described above, the first slurry mixture (i.e., Slurry 1) did not utilize a dispersant 24. As a consequence, the Slurry 1 composition contained substantial quantities of foam. Moreover, the powder product resulting therefrom (i.e., the Trial 1 product shown in FIG. 12) did not exhibit a high yield of agglomerated particles (i.e., particles 14). To the contrary, most of the particles produced from the Slurry 1 composition were generally flake-like in nature, as best seen in FIG. 12. The flake-like particles of the Trial 1 powder product appear to be highly similar to particles associated with conventional molybdenum disulfide powders produced by conventional processes. Still further, those agglomerated particles that were produced from Slurry 1 (i.e., via Trial 1) were generally aspherical in nature, again as best seen in FIG. 12.

Figure 8:
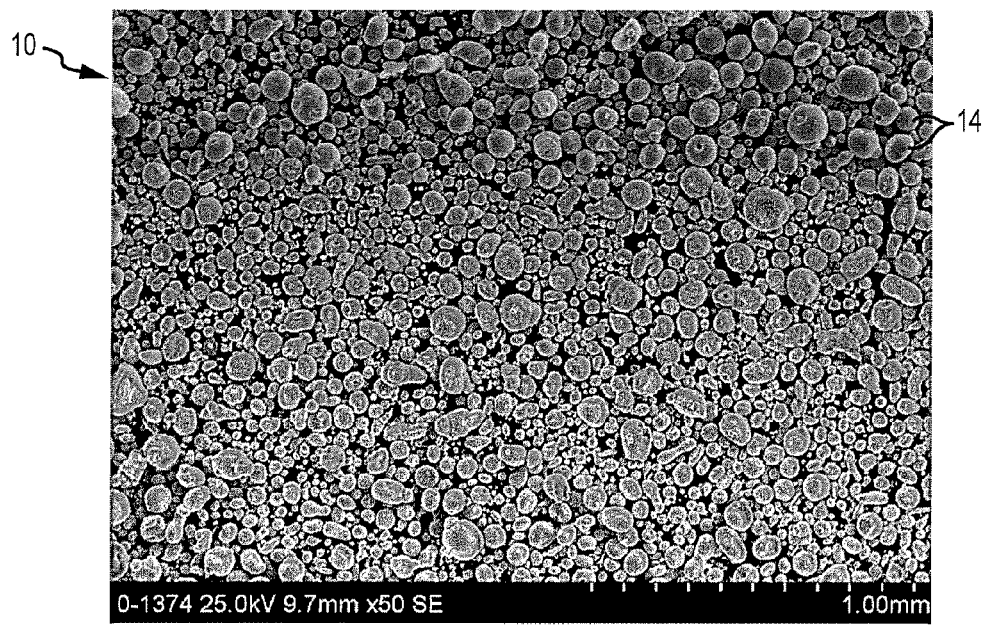
FIG. 8 is a scanning electron micrograph at 50× magnification of a molybdenum disulfide spherical powder produced from a Trial 5 embodiment.

In contrast to Slurry 1, Slurries 2-4 all utilized a dispersant 24. Significantly, each of Slurries 2-4 was substantially foam-free. Moreover, the powder products 10 made from Slurries 2-4 (i.e., via Trials 2-9) exhibited high yields of highly-spherical agglomerated particles 14, as best seen in FIGS. 1 and 8. It is believed that the addition of the dispersant 24 causes a much higher quantity of the molybdenum disulfide precursor material 18 to be suspended in the liquid components of the slurry 26 than is the case where a dispersant 24 is not present. Consequently, a greater percentage of the molybdenum disulfide precursor material 18 will be suspended and/or dispersed in the droplets of the slurry 26 formed during the spray drying process.

The various powder preparations, i.e., spherical powder products 10, made from the dispersant-containing slurries (i.e., Slurries 2-4, corresponding to Trials 2-9) were then analyzed, the results of which are presented in Tables IV-VIII. However, the spherical powder product made from the Slurry 1 composition (without the dispersant 24), was not analyzed.

With reference now primarily to Table I, the various slurries 26 (i.e., Slurries 1-4) were prepared in the manner described herein. More specifically, each slurry composition was prepared by mixing the liquid 20, binder 22, and (for Slurries 2-4) dispersant 24. For each slurry composition, the liquid 20 was first combined with the binder 22 and dispersant 24 (for Slurries 2-4) before the molybdenum disulfide precursor material 18 was added. The various constituents were then mixed together or blended (e.g., by a suitable mixer 28) in order to form a well-mixed (i.e., substantially homogeneous) slurry 26. As noted herein, the mixing process resulted in the formation of a significant amount of foam in the Slurry 1 composition. However, Slurries 2-4 did not result in the formation of significant amounts of foam due to the presence of the dispersant 24.

The four slurry compositions (i.e., Slurries 1-4) were similar in composition, except that Slurry 1 did not involve a dispersant 24, as noted. More specifically, the Slurry 1 composition comprised 42.27% by weight liquid 20 (e.g., as deionized water), 1.98% by weight binder 22 (e.g., as polyvinyl alcohol), with the balance, i.e., 55.75% by weight, being the molybdenum disulfide precursor material 18. The molybdenum disulfide precursor material 18 used in the Slurry 1 composition comprised the "technical fine" grade of molybdenum disulfide and was obtained from the Climax Molybdenum Company, as specified herein.

The calculated solids loading of the Slurry 1 composition was 55.75% by weight. As used herein, the term "calculated solids loading" refers to the solids content of the slurry 26 based on the relative weights of precursor material 18 and liquids (e.g., 20, 22, and 24) that were combined to form the slurry 26. However, the actual (i.e., measured) solids loading for the Slurry 1 composition was 55.93% by weight, as set forth in Table I. The reasons for the variation between the calculated and actual solids loadings of the Slurry 1 composition are thought to be due primarily to presence of some solids in the other liquid components (e.g., binder 22), from weighing (i.e., measurement) errors, and possibly from inhomogeneities in the slurry mixture (e.g., due to the presence of significant amounts of foam in the Slurry 1 composition).

The second, third, and fourth slurry compositions 26 (i.e., Slurries 2-4), were substantially identical to one another, with each slurry composition 26 comprising 38.7% by weight liquid 20 (e.g., as deionized water), 6.2% by weight binder 22 (e.g., as polyvinyl alcohol), 1% by weight dispersant (e.g., as Triton X-100), with the remainder comprising the molybdenum disulfide precursor material 18. Thus, and unlike the Slurry 1 composition, each of Slurries 2-4 involved the addition of a dispersant 24. Also, the molybdenum disulfide precursor material 18 used for Slurries 2-4 comprised the "superfine" grade of molybdenum disulfide from the Climax Molybdenum Company, as opposed to the "technical fine" grade used for the Slurry 1 composition.

The calculated solids loading of each of Slurries 2-4 was 54.1% by weight. However, the actual (i.e., measured) solids loadings for Slurries 2-4 differed somewhat from the calculated solids loading, as set forth in Table I. The reasons for the variation between the calculated and actual solids loadings of Slurries 2-4 are thought to be due primarily to the solids content in the binder 22 and dispersant 24, as well as from measurement errors in weighing the various ingredients.

TABLE I

| Slurry Comp. | Water kg(lbs) | Binder kg(lbs) | Dispersant kg(lbs) | MoS$_2$ Powder kg(lbs) | Actual Solids (wt. %) |
|---|---|---|---|---|---|
| 1 | 10.7 (23.5) | 0.5 (1.1) | — | 14 (31) | 55.93% |
| 2 | 45.4 (100.1) | 7.3 (16.0) | 1.2 (2.6) | 63.5 (140) | 54.48% |
| 3 | 58.4 (128.8) | 9.3 (20.6) | 1.5 (3.3) | 81.6 (180) | 56.28% |
| 4 | 25.6 (56.5) | 4.1 (9.1) | 0.7 (1.5) | 35.8 (79) | 58.23% |

The slurries 26 were then fed into the pulse combustion spray dryer 30 in the manner described herein to produce nine (9) different molybdenum disulfide spherical powder 10 batches or preparations, designated herein as the Trials 1-9 preparations. As indicated in Tables II and III, the Slurry 1 composition was used for Trial 1, whereas the Slurry 2 composition was used for Trials 2-4. Trials 5-7 used the Slurry 3 composition and Trials 8 and 9, the Slurry 4 composition.

The temperature of the pulsating stream of hot gases 50 was controlled to be within a range of about 491° C. to about 599° C., as indicated in Tables II and III. The pulsating stream of hot gases 50 produced by the pulse combustion spray dryer 30 drove-off substantially all of the liquid 20, binder 22, and dispersant 24 (i.e., for Slurries 2-4) from the slurry 26, resulting in the formation of the spherical powder product 10. Various operating parameters for the pulse combustion spray dryer 30 for Trials 1-4 (produced from Slurry compositions 1 and 2) are set forth in Table II, whereas the operating parameters for Trials 5-9 (produced from Slurry compositions 3 and 4) are set forth in Table III:

TABLE II

| | Slurry Composition | | | |
|---|---|---|---|---|
| | 1 | 2 | | |
| | Trial No. | | | |
| | 1 | 2 | 3 | 4 |
| Nozzle | T_Open | T_Open | T_Open | T_Open |
| Venturi Size, mm (inches) | 35 (1.375) | 35 (1.375) | 35 (1.375) | 35 (1.375) |
| Venturi Position | 4 | 4 | 4 | 4 |
| Heat Release, kJ/hr (btu/hr) | 84,404 (80,000) | 84,404 (80,000) | 84,404 (80,000) | 84,404 (80,000) |
| Fuel Valve, (%) | 34.5 | 34.5 | 34.5 | 34.5 |
| Contact Temp., ° C. (° F.) | 599 (1,110) | 593 (1,100) | 528 (983) | 526 (979) |
| Exit Temp., ° C. (° F.) | 116 (240) | 116 (240) | 107 (225) | 116 (240) |
| Outside Temp., ° C. (° F.) | 22 (72) | 23 (73) | 23 (74) | 24 (75) |
| Baghouse ΔP, mm H$_2$O (inches H$_2$O) | — | — | — | — |
| Turbo Air, MPa (psi) | 0.189 (27.5) | 0.089 (13.0) | 0.083 (12.0) | 0.083 (12.0) |
| RAV, (%) | 85 | — | — | — |
| Ex. Air Setpoint, (%) | 60 | 60 | 60 | 60 |
| Comb. Air Setpoint, (%) | 60 | 52 | 51 | 48 |
| Quench Air Setpoint, (%) | 49 | 47 | 47 | 47 |
| Trans. Air Setpoint, (%) | 5 | 5 | 5 | 5 |
| Feed Pump, (%) | 4.7 | 4.1 | 5.3 | 3.3 |
| Comb. Air Pressure, MPa (psi) | 0.010 (1.47) | 0.011 (1.58) | 0.011 (1.56) | 0.010 (1.46) |
| Quench Air Pressure, MPa (psi) | 0.008 (1.09) | 0.009 (1.37) | 0.009 (1.36) | 0.009 (1.34) |
| Combustor Can Pressure, MPa (psi) | 0.009 (1.36) | 0.009 (1.34) | 0.009 (1.37) | 0.008 (1.26) |

TABLE III

| | Slurry Composition | | | | |
|---|---|---|---|---|---|
| | 3 | | | 4 | |
| | Trial No. | | | | |
| | 5 | 6 | 7 | 8 | 9 |
| Nozzle | T_Open | T_Open | T_Open | T_Open | T_Open |
| Venturi Size, mm (inches) | 35 (1.375) | 35 (1.375) | 35 (1.375) | 38.1 (1.5) | 38.1 (1.5) |
| Venturi Position | 4 | 4 | 4 | Tapered | Tapered |
| Heat Release, kJ/hr (btu/hr) | 84,404 (80,000) | 84,404 (80,000) | 84,404 (80,000) | 84,404 (80,000) | 84,404 (80,000) |
| Fuel Valve, (%) | 34.6 | 34.6 | 34.5 | 34.5 | 34.5 |
| Contact Temp., ° C. (° F.) | 511 (952) | 571 (1,060) | 549 (1,020) | 522 (972) | 491 (915) |
| Exit Temp., ° C. (° F.) | 116 (240) | 118 (245) | 112 (233) | 116 (240) | 116 (240) |
| Outside Temp., ° C. (° F.) | 21 (70) | 23 (74) | 26 (78) | 29 (85) | 23 (74) |
| Baghouse ΔP, mm H$_2$O (inches H$_2$O) | 2.29 (0.09) | 1.78 (0.07) | 3.81 (0.15) | — | 0.25 (0.01) |
| Turbo Air, MPa (psi) | 0.089 (13.0) | 0.086 (12.5) | 0.086 (12.5) | 0.095 (13.8) | 0.094 (13.6) |
| RAV, (%) | — | — | — | — | — |
| Ex. Air Setpoint, (%) | 60 | 60 | 60 | 60 | 60 |

TABLE III-continued

| | Slurry Composition | | | | |
|---|---|---|---|---|---|
| | 3 | | | 4 | |
| | Trial No. | | | | |
| | 5 | 6 | 7 | 8 | 9 |
| Comb. Air Setpoint, (%) | 48 | 46 | 48 | 51 | 54 |
| Quench Air Setpoint, (%) | 46 | 46 | 46 | 47 | 48 |
| Trans. Air Setpoint, (%) | 5 | 5 | 5 | 5 | 5 |
| Feed Pump, (%) | 4.2 | 4.2 | 5.4 | 5.6 | 5.4 |
| Comb. Air Pressure, MPa (psi) | 0.010 (1.45) | 0.009 (1.35) | 0.010 (1.45) | 0.010 (1.45) | 0.011 (1.6) |
| Quench Air Pressure, MPa (psi) | 0.009 (1.33) | 0.009 (1.33) | 0.009 (1.35) | 0.009 (1.33) | 0.009 (1.34) |
| Combustor Can Pressure, MPa (psi) | 0.008 (1.25) | 0.008 (1.25) | 0.008 (1.25) | 0.008 (1.25) | 0.008 (1.26) |

The resulting molybdenum disulfide spherical powder products 10 produced by spray dry Trials 1-9 comprised generally spherically-shaped particles 14 that are themselves agglomerations of smaller sub-particles 16. However, and as was described earlier, the molybdenum disulfide spherical powder product 10 produced by Trial 1 (from Slurry 1), contained substantially fewer agglomerated particles 14 compared to the powder products produced by Trials 2-9. Moreover, those agglomerated particles 14 in the Trial 1 preparation were generally less spherical in nature compared to the powder preparations of Trials 2-9.

More specifically, and with reference now primarily to FIG. 12, the powder product 10 produced by Trial 1 contained substantially fewer agglomerated particles 14 compared to the powder products made from dispersant-containing slurries 26 (i.e., Slurries 2-4) shown in FIGS. 1 and 8. Moreover, those agglomerated particles 14 that were produced by Trial 1 (i.e., from Slurry 1) were generally less spherical than those produced from slurries containing dispersant 24, again, as best seen by comparing the powder of FIG. 12 (made from Slurry 1) with the powders of FIGS. 1 and 8 (made from slurries 26 containing a dispersant 24). The addition of a dispersant 24 to slurry 26 is clearly important in producing a powder product 10 having a high percentage of substantially spherical agglomerated particles 14.

Figure 9:
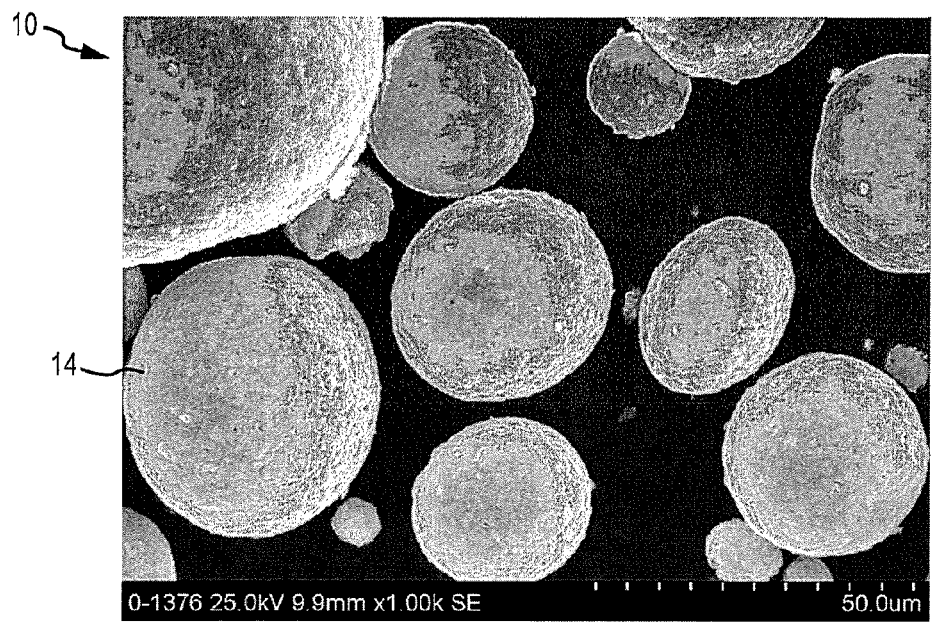
FIG. 9 is a scanning electron micrograph at 1000× magnification of a molybdenum disulfide spherical powder produced from a Trial 7 embodiment.
Figure 10:
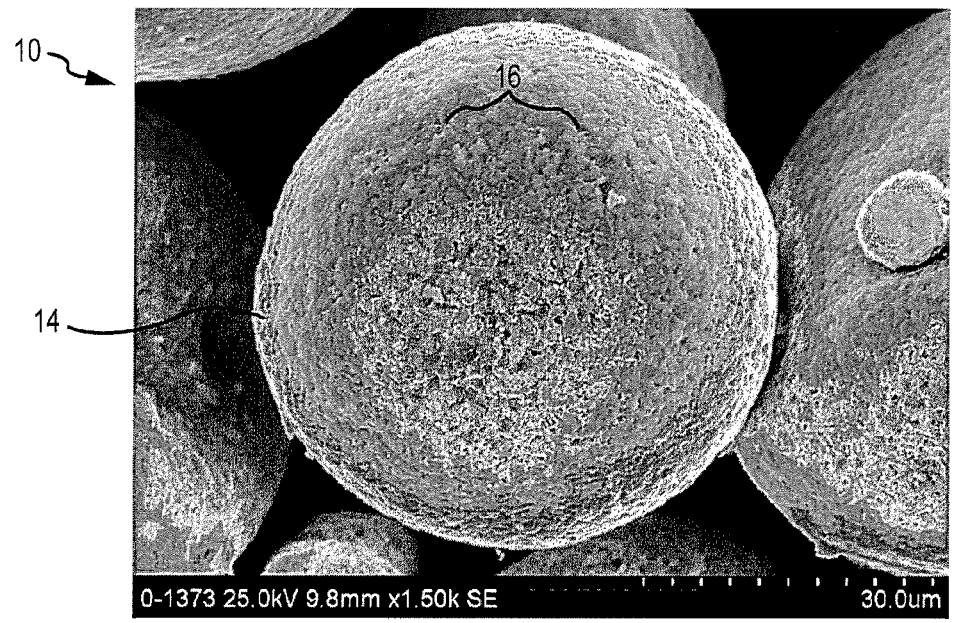
FIG. 10 is a scanning electron micrograph at 1500× magnification of a molybdenum disulfide spherical powder produced from a Trial 4 embodiment.
Figure 11:
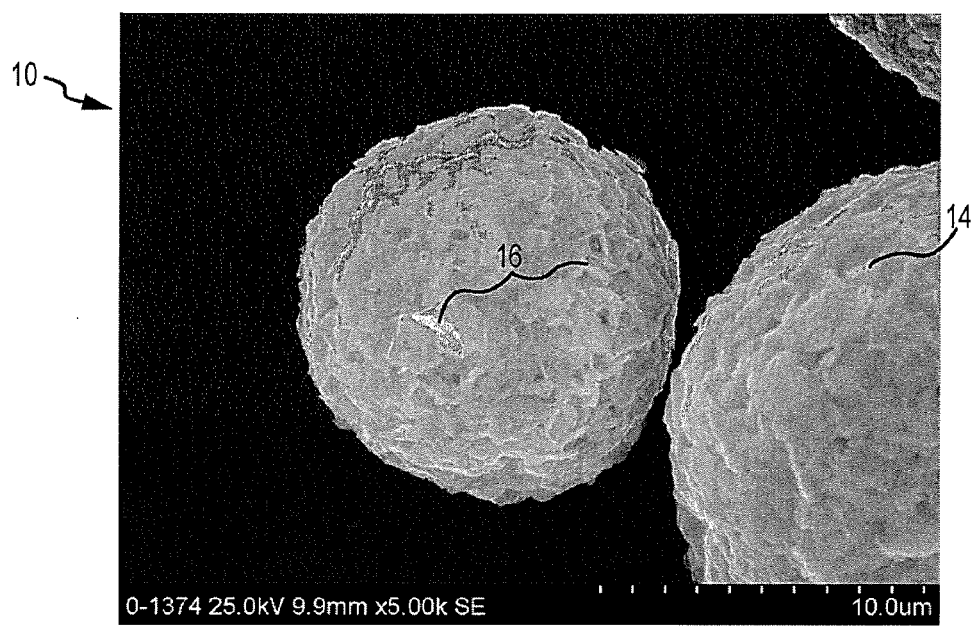
FIG. 11 is a scanning electron micrograph at 5000× magnification of molybdenum disulfide spherical particles produced from the Trial 5 embodiment showing individual agglomerated sub-particles.

Considering now primarily those powder products produced by Trials 2-9 (using dispersant-containing slurries 26) and with reference to FIGS. 1-4 and 8-11, the molybdenum disulfide spherical powder product 10 comprises a plurality of generally spherically-shaped particles 14 that are themselves agglomerations of smaller sub-particles 16, as best seen in FIGS. 1, 9, and 10. The smaller sub-particles 16 comprise flake-like or plate-like particles that are adhered together, so that the overall spherical particles 14 comprise a lamellar type structure that can be characterized in the alternative as "spheres made of flakes," as best seen in FIGS. 2 and 11. Moreover, many of the agglomerated spherical particles 14 comprising the molybdenum disulfide powder product 10 are substantially solid, i.e., non-hollow, as best seen in FIG. 3, while others are shell-like or hollow in structure, as best seen in FIG. 4.

The generally spherically-shaped agglomerated particles also appear to have a thin film or coating thereon, as evidenced by the comparatively smooth, polished appearance of the particles 14, such as those particles 14 pictured in FIGS. 3, 4, 9, and 10. The thin film or coating on the particles 14 likely comprises residual amounts of binder 22, dispersant 24, or some combination thereof, that are brought to the surface of the particles 14 during the spray drying process.

As discussed above, a significant difference between the molybdenum disulfide spherical powder product 10 of the present invention and conventional molybdenum disulfide powders relates to the flowability of the powder product 10. More specifically, the molybdenum disulfide spherical powder product 10 is generally quite flowable, whereas conventional molybdenum disulfide powders are not. For example, the powder product embodiments 10 produced by Trials 2-9 exhibited Hall flowabilities of less than about 105 s/50 g of material. The powder product 10 produced by Trial 8 exhibited the greatest flowability of 73.8 s/50 g, as set forth in Table IV.

The spherical powder product 10 produced by Trials 2-9 also indicate good densities for the powder product, densities that are generally comparable to conventional molybdenum disulfide powders of similar size. Moreover, the various exemplary powder products produced by Trials 2-9 exhibited highly uniform densities, with little variation among the various powder preparations. Scott, tap, and Hall densities (in g/cc) are presented in Table IV, as well as the moisture and sulfur content for the powders produced by the various trials.

TABLE IV

| Trial | Moisture (wt. %) | Sulfur (wt. %) | Scott Density (g/cc) | Tap Density (g/cc) | Hall Density (g/cc) | Hall Flow (s/50 g) |
|---|---|---|---|---|---|---|
| 2 | 0.9 | 38.11 | 0.93 | 1.14 | 0.90 | 101.3 |
| 3 | 1.3 | 37.98 | 0.92 | 1.14 | 0.90 | 104.8 |
| 4 | 1.6 | 37.53 | 0.93 | 1.13 | 0.89 | 100.2 |
| 5 | 0.8 | 37.45 | 0.96 | 1.16 | 0.92 | 83.6 |
| 6 | 0.7 | 37.62 | 0.95 | 1.15 | 0.92 | 86.6 |
| 7 | 0.8 | 37.88 | 0.95 | 1.16 | 0.92 | 89.0 |
| 8 | 0.8 | 37.16 | 0.98 | 1.18 | 0.95 | 73.8 |
| 9 | 0.6 | 37.90 | 0.97 | 1.18 | 0.94 | 78.7 |

The molybdenum disulfide spherical powder product 10 produced in accordance with the teachings provided herein will comprise a wide range of sizes, and particles 14 having sizes ranging from about 1 μm to about 500 μm, such as, for example, sizes ranging from about 1 μm to about 100 μm, can be readily produced by the following the teachings provided herein. Sieve analyses of various "as-produced," i.e., green molybdenum disulfide spherical powder products 10 are provided in Tables V and VI.

TABLE V

| | Sieve Analysis (US Mesh, wt. %) | | | |
|---|---|---|---|---|
| Trial | +140 | −140/+170 | −170/+200 | −200/+230 |
| 2 | 4.8 | 5.5 | 13.5 | 15.0 |
| 3 | 6.9 | 6.4 | 14.6 | 15.2 |
| 4 | 4.7 | 5.2 | 12.8 | 14.7 |
| 5 | 10.3 | 7.4 | 14.1 | 13.7 |
| 6 | 8.8 | 7.5 | 14.7 | 14.0 |
| 7 | 9.9 | 7.3 | 14.3 | 14.3 |
| 8 | 21.3 | 10.0 | 16.1 | 14.7 |
| 9 | 15.2 | 9.1 | 16.5 | 16.0 |

TABLE VI

| | Sieve Analysis (US Mesh, wt. %) | | | |
|---|---|---|---|---|
| Trial | −230/+270 | −270/+325 | −325/+400 | −400 |
| 2 | 13.1 | 11.5 | 9.7 | 26.9 |
| 3 | 12.5 | 10.4 | 8.6 | 25.4 |
| 4 | 12.9 | 11.6 | 9.6 | 28.5 |
| 5 | 11.5 | 10.3 | 9.3 | 23.4 |
| 6 | 12.3 | 10.8 | 9.8 | 22.1 |
| 7 | 11.9 | 10.6 | 9.5 | 22.2 |
| 8 | 12.2 | 9.4 | 6.8 | 9.5 |
| 9 | 13.4 | 10.6 | 7.6 | 11.6 |

Additional physical characteristics of the molybdenum disulfide spherical powder products 10 produced by Trials 2-9 are presented in Table VII. More specifically, the exemplary powder samples produced by Trials 2-9 exhibited Fisher sizes or Fisher numbers (i.e., as measured by a Fisher Sub-Sieve Sizer or "FSSS") ranging from about 1.4 μm to about 2.0 μm, which are slightly larger than the specifications for the Climax "technical fine" grade of molybdenum disulfide, which is also presented in Table VII for comparison. Median particle size (i.e., the "D50" particle size) for the "as-produced" molybdenum disulfide spherical powder product 10 is about 50 μm, ranging from about 46 μm to about 61 μm. The "D99" particle size of the as-produced spherical powder product is about 220 μm, ranging from about 177 μm to about 262 μm. Corresponding specifications for currently-available Climax "technical," "technical fine," and "superfine" grades of conventional molybdenum disulfide are also presented in Table VII for comparison purposes.

Also reported in Table VII are the so-called "acid insoluble" material content and "acid number" of the as-produced molybdenum disulfide spherical powder product 10. The acid insoluble content refers to the amount (usually expressed in weight percent) of acid-insoluble matter and iron in the material. Acid number refers to the amount (in mg) of potassium hydroxide (KOH) required to neutralize the acid in a one-gram sample of material. Both the acid insoluble content and acid number are commonly reported specifications for molybdenum disulfide powders. Again, corresponding specifications for currently-available Climax "technical," "technical fine," and "superfine" grades of conventional molybdenum disulfide are also presented in Table VII for comparison.

It is currently believed that the acid number for the powder samples may be artificially high due to the presence of residual amounts of binder 22 in the as-produced powder product, thus may not be directly comparable to the acid number of conventional molybdenum disulfide powders.

TABLE VII

| Trial | FSSS (μm) | D50 (μm) | D99 (μm) | Acid Insol. (wt. %) | Acid No. (mg KOH/g) |
|---|---|---|---|---|---|
| 2 | 1.4 | 52.95 | 201.6 | 0.24 | 3.24 |
| 3 | 1.4 | 48.30 | 177.1 | 0.23 | 3.87 |
| 4 | 1.5 | 46.35 | 178.5 | 0.32 | 4.21 |
| 5 | 1.6 | 54.28 | 261.7 | 0.26 | 3.93 |
| 6 | 1.6 | 52.50 | 221.8 | 0.23 | 3.69 |
| 7 | 1.8 | 51.71 | 217.2 | 0.25 | 4.54 |
| 8 | 1.9 | 61.48 | 256.2 | 0.24 | 3.55 |
| 9 | 2.0 | 60.89 | 248.9 | 0.26 | 3.64 |
| Climax Superfine | 0.4-0.45 | 0.9-1.6 | 7.0 | 0.50 | 3.00 |
| Climax Tech. Fine | 0.65-0.8 | 4.0-6.0 | 36.0 | 0.50 | 0.25 |
| Climax Tech. | 3.0-4.0 | 16.0-30.0 | 190 | 0.50 | 0.5 |

Additional powder assay results are presented in Table VIII. More specifically, Table VIII reports the molybdenum disulfide content (MoS$_2$) for the spherical powder product, which is about 95 weight percent. MoO$_3$, iron, and carbon contents are also reported, as are oils and water. For comparison purposes, corresponding specifications for currently-available Climax "technical," "technical fine," and "superfine" grades of conventional molybdenum disulfide are also presented in Table VIII.

TABLE VIII

| Trial | MoS$_2$ (wt. %) | MoO$_3$ (wt. %) | Iron (wt. %) | Carbon (wt. %) | Oil (wt. %) | H$_2$O (wt. %) |
|---|---|---|---|---|---|---|
| 2 | 94.79 | 0.078 | 0.08 | 2.95 | 1.163 | 0.661 |
| 3 | 94.71 | 0.071 | 0.08 | 2.88 | 1.246 | 0.750 |
| 4 | 94.72 | 0.071 | 0.08 | 2.99 | 1.144 | 0.638 |
| 5 | 95.13 | 0.064 | 0.08 | 2.79 | 1.086 | 0.554 |
| 6 | 95.10 | 0.063 | 0.08 | 2.88 | 1.147 | 0.463 |
| 7 | 95.07 | 0.071 | 0.07 | 2.86 | 1.189 | 0.461 |
| 8 | 95.39 | 0.059 | 0.08 | 2.78 | 0.973 | 0.446 |
| 9 | 95.28 | 0.051 | 0.08 | 2.77 | 1.103 | 0.427 |
| Climax Superfine | ~98 | 0.15 | 0.25 | 1.50 | 0.40 | 0.15 |
| Climax Tech. Fine | ~98 | 0.05 | 0.25 | 1.50 | 0.40 | 0.05 |
| Climax Tech. | ~98 | 0.05 | 0.25 | 1.50 | 0.05 | 0.02 |

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A molybdenum disulfide powder comprising substantially spherically-shaped particles of molybdenum disulfide formed from agglomerations of generally flake-shaped subparticles of molybdenum disulfide, said molybdenum disulfide powder comprising at least about 90% by weight molybdenum disulfide.

2. The powder of claim 1, wherein the molybdenum disulfide powder is flowable.

3. The powder of claim 2, wherein said molybdenum disulfide powder comprises a Hall flowability of less than about 105 s/50 g.

4. The powder of claim 2, wherein said molybdenum disulfide powder comprises a Hall flowability in a range of about 73 s/50 g to about 105 s/50 g.

5. The powder of claim 1, wherein said molybdenum disulfide powder comprises a Scott density of at least about 0.9 g/cc.

6. The powder of claim 1, wherein said molybdenum disulfide powder comprises a Scott density in a range of about 0.9 g/cc to about 1 g/cc.

7. The powder of claim 1, wherein the molybdenum disulfide powder comprises at least about 94% by weight molybdenum disulfide.

8. The powder of claim 1, wherein the molybdenum disulfide particles have a Fisher number in a range of about 1 µm to about 2 µm.

9. The powder of claim 1, wherein the molybdenum disulfide particles have a D50 particle size in a range of about 46 µm to about 61 µm.

10. The powder of claim 1, wherein the molybdenum disulfide particles have a D99 particle size in a range of about 177 µm to about 262 µm.

11. The powder of claim 1, wherein at least some of the particles are substantially solid and wherein others of the particles are hollow.

12. The powder of claim 1, further comprising a surface coating thereon.

13. The powder of claim 12, wherein said surface coating comprises polyvinyl alcohol.

14. A molybdenum disulfide powder comprising molybdenum disulfide sub-particles that are agglomerated together to form individual, substantially spherically-shaped particles, said molybdenum disulfide powder comprising at least about 90% by weight molybdenum disulfide.

15. The powder of claim 14, wherein said spherically-shaped particles have sizes in a range of about 1 µm to about 500 µm.

16. The powder of claim 14, wherein said spherically-shaped particles have sizes in a range of about 1 µm to about 100 µm.

17. The powder of claim 14, wherein about 40-50% by weight of said spherically-shaped particles are smaller than about 53 µm.

18. Generally spherically-shaped molybdenum disulfide particles formed by agglomerating a plurality of flake-shaped molybdenum disulfide sub-particles, said generally spherically-shaped molybdenum disulfide particles comprising at least about 90% by weight molybdenum disulfide and being flowable as measured on a Hall flow scale.

19. A coated article, comprising:
an article; and
a surface coating on at least a portion of said article formed by depositing individual particles of a molybdenum disulfide spherical powder on said article so that individual particles of said molybdenum disulfide spherical powder bonds with said article, said molybdenum disulfide spherical powder comprising substantially spherically-shaped particles of molybdenum disulfide formed from agglomerations of generally flake-shaped sub-particles of molybdenum disulfide, said molybdenum disulfide spherical powder comprising at least about 90% by weight molybdenum disulfide.

20. A surface coating comprising a molybdenum disulfide spherical powder deposited with sufficient energy to cause said molybdenum disulfide spherical powder to bond with a substrate and form said surface coating, said molybdenum disulfide spherical powder comprising substantially spherically-shaped particles of molybdenum disulfide formed from agglomerations of generally flake-shaped sub-particles of molybdenum disulfide, said molybdenum disulfide spherical powder comprising at least about 90% by weight molybdenum disulfide.

21. A method for producing a molybdenum disulfide powder, comprising:
providing a supply of molybdenum disulfide precursor material;
providing a supply of a liquid;
providing a supply of a binder;
combining said molybdenum disulfide precursor material with the liquid and the binder to form a slurry;
feeding said slurry into a stream of hot gas; and
recovering the molybdenum disulfide powder, said molybdenum disulfide powder comprising substantially spherically-shaped particles of molybdenum disulfide formed from agglomerations of generally flake-shaped sub-particles of molybdenum disulfide, said molybdenum disulfide powder comprising at least about 90% by weight molybdenum disulfide.

22. The method of claim 21, wherein feeding said slurry into a stream of hot gas comprises atomizing said slurry and contacting said atomized slurry with the stream of hot gas.

23. The method of claim 21, further comprising providing a supply of a dispersant and wherein said combining further comprises combining said molybdenum disulfide precursor material with the liquid, the binder, and the dispersant to form a slurry.

24. The method of claim 21, wherein said slurry comprises between about 50% to about 60% by weight solids.

25. The method of claim 21, wherein said slurry comprises between about 52% to about 58% by weight solids.

26. The method of claim 21, wherein said slurry comprises between about 52% to about 56% by weight solids.

27. The method of claim 21, wherein providing a supply of a binder comprises providing a supply of polyvinyl alcohol.

28. The method of claim 23, wherein providing a supply of a liquid comprises providing a supply of deionized water and wherein providing a supply of a dispersant comprises providing a supply of one or more selected from the group consisting of alcohol ethoxylates and alcohol alkoxylates.

29. A method for producing a surface coating, comprising:
providing a molybdenum disulfide spherical powder comprising substantially spherically-shaped particles of molybdenum disulfide formed from agglomerations of generally flake-shaped sub-particles of molybdenum disulfide, said molybdenum disulfide spherical powder comprising at least about 90% by weight molybdenum disulfide; and
depositing said molybdenum disulfide spherical powder on a substrate to form the surface coating.

30. The method of claim 29, wherein said depositing comprises spraying said molybdenum disulfide spherical powder with sufficient energy to cause said molybdenum disulfide spherical powder to bond to the substrate while in a plastic state to form the surface coating.

31. The method of claim 30, wherein said spraying comprises one or more selected from the group consisting of thermal spray deposition, plasma spray deposition, HVOF spray deposition, and cold spray deposition.

32. The method of claim 29, wherein providing a supply of molybdenum disulfide spherical powder comprises:
providing a supply of molybdenum disulfide precursor material;
providing a supply of a liquid;
providing a supply of a dispersant;

combining said molybdenum disulfide precursor material with the liquid and the dispersant to form a slurry;

feeding said slurry into a stream of hot gas; and recovering the molybdenum disulfide spherical powder.

33. The method of claim 32, wherein feeding said slurry into a stream of hot gas comprises atomizing said slurry and contacting said atomized slurry with the stream of hot gas.

34. The method of claim 32, wherein said slurry comprises between about 50% to about 60% by weight solids.

* * * * *